United States Patent Office 3,282,310
Patented Nov. 1, 1966

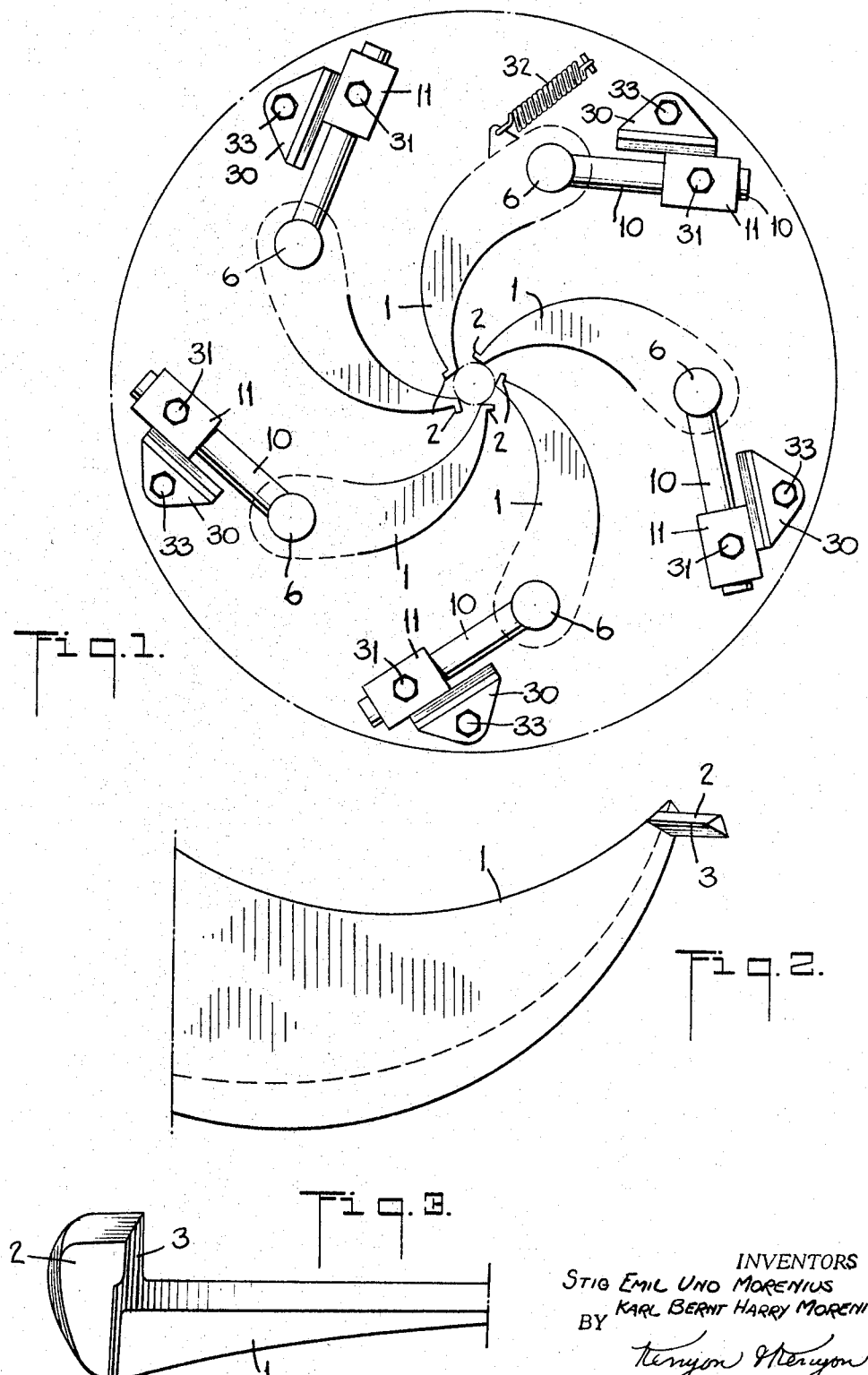

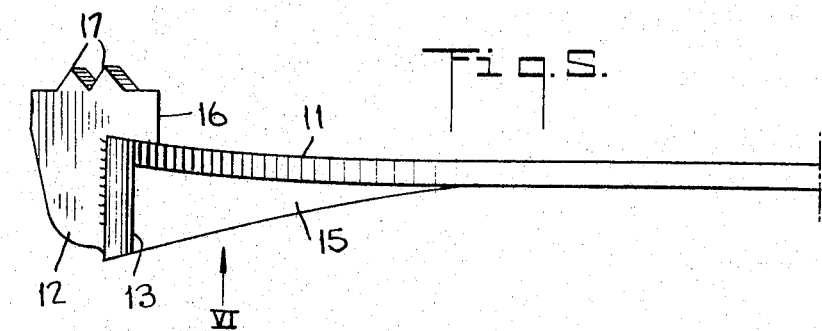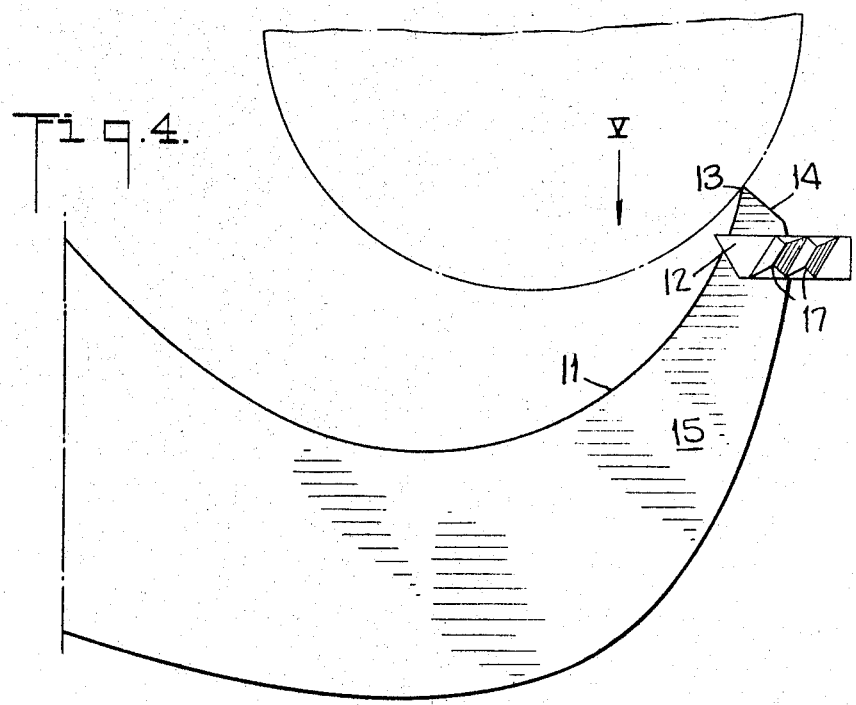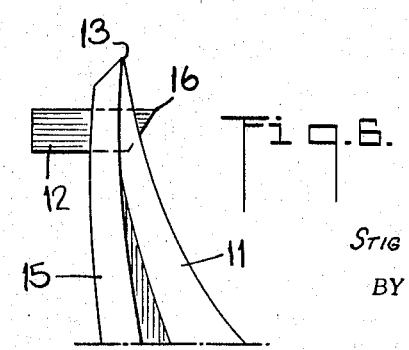

3,282,310
PRUNING MACHINE
Stig Emil Uno Morenius and Karl Bernt Harry Morenius, both of Postbox 425, Sundsvall, Sweden
Filed Sept. 28, 1962, Ser. No. 229,258
Claims priority, application Sweden, Sept. 30, 1961, 9,739/61
13 Claims. (Cl. 144—2)

The present invention has for its object to produce a simple and compact but dependable and effective pruning machine with a great working capacity. The machine is also easily combined with devices for barking, rinding or peeling, whereby pruning as well as barking may be performed simultaneously.

The pruning machine according to the invention is characterized in that one or more tools which are adapted to circulate around the logs or stocks to be pruned and adapted to abut resiliently against the logs carry one or more pruning members arranged to remove branches, twigs, sprigs, snags and the like, preferably by a cutting and blowing action.

According to the invention the pruning member may be situated before a barking member or edge likewise situated on the tool in respect of the direction of movement of the logs.

The pruning member may be formed by a special part fastened to or mounted on the tool e.g. through welding, soldering, screws or the like. The special part may consist of sheet metal.

The pruning member may also be formed by a portion of the tool itself, in that this portion may have a cutting edge forming a continuation to a known raising edge adapted to conduct the tool onto the envelope surface of the log.

In order not to interfere unsuitably with the function of the barking member the active portion of the pruning member may be slightly more spaced from the axis of the tool in respect of its circulating movement than the active portion of the barking member.

The tool may suitably be swingably mounted on a hollow rotor through the hole of which the logs are moved and into the hole of which the tool is extending.

The said sheet metal may be bent in such a manner that the bent edge will form the effective cutting edge of the pruning member.

The pruning machine according to the invention will make the lumbering work much more efficient, since the pruning which hitherto has been a time consuming and complicated work may be performed as rapidly, simply and efficiently as machine barking.

The possibility of combining, in one and the same tool, barking as well as pruning members doubles the value of the invention.

The invention will be further described in the following description, reference being made to the accompanying drawings.

FIG. 1 is a somewhat diagrammatic view seen in the direction of the axis of a hollow rotor, not shown, in which are mounted swingable tools with barking as well as pruning portions.

FIG. 2 is a view at a larger scale of one of the tools.

FIG. 3 is a view seen from above in FIG. 2.

FIG. 4 is a plan view of another embodiment of the tool having barking as well as pruning members.

FIG. 5 is a view seen in the direction of the arrow V in FIG. 4.

FIG. 6 is a view seen in the direction of the arrow VI in FIG. 5.

Figure 8:
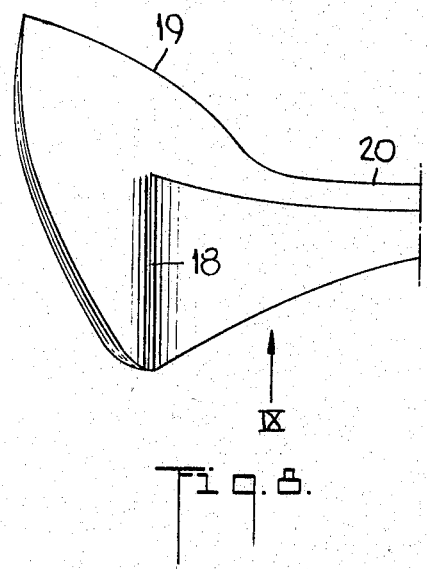
FIG. 8 is a view seen in the direction of the arrow VIII in FIG. 7.

Reference is first made to FIGS. 1 and 2 where the tools are designated by 1 and the pruning members by 2. A pruning member 2 may consist of a part which by welding, soldering, screws or the like is fastened to the tool 1 in question; it may also consist of a piece of bent sheet metal. The pruning members 2 are adapted to abut against logs or stocks which shall be pruned and for this purpose are being forwarded more or less centrally through the hollow rotor not shown. The tools 1 are pivotally or swingably mounted on axles 6 and thus adapted to abut resiliently against the logs. With each of the tools there is rigidly fastened an arm 10 carrying a weight 11 adjustable along the arm 10 and fixed in a suitable position by a screw 31. The weight 11 causes the pruning member to be pressed against the log. 30 designates abutments fastened to the hollow rotor by bolts 33. Springs 32 tend to swing the tools 1 in a clockwise direction so as to facilitate the entering of the logs.

Only one spring is shown. In FIG. 1 five such tools 1 are shown. The machine may, however, have an arbitrary number of tools.

When the hollow rotor rotates and the pruning members 2 are performing their circulating movements around the log the cutting edge 3 (see FIGS. 2 and 3) of the pruning member will positively hack off all branches of the log. If the edge 3 is sharp there is also a cutting action. The function of the pruning tool is followingly completely different from the function of barking tools where a scraping action is performed.

The tool provided with the pruning member according to the invention may be provided with arbitrary known guiding, raising or sloping devices in order to conduct the tool and the pruning member rapidly and easily onto the envelope surface of the log.

The embodiment in FIGS. 4-6 has a raising edge 11 and a pruning member 12 as well as a barking member in the form of an end portion 14 of the tool 15, formed as a barking edge 13. The pruning member 12 has a hacking or cutting edge 16 which as the edge 13 of the barking member 14 is substantially transverse to the main lengthwise direction of the tool 15 or to the diameter of the hollow rotor. The two edges are approximately parallel to the feeding direction of the logs.

The edges 13 and 16 have also differently efficient directions which differ from each other by about 45°. These different directions of the edges 13 and 16 also involve a different manner of action, in that the edge 13 is scraping whilst the edge is hacking or cutting. The angle between the debarking edge 13 and the pruning edge 16 can be varied within wide limits, e.g. between 25 and 90°, preferably between 30 and 60° and suitably about 45°.

The logs are fed at right angles to the surface of the paper in FIG. 4 and rotated in a counterclockwise direction and will therefore first contact the pruning member 12 which is provided with mutually parallel cams 17 adapted to engage the log and to swing up the tool and the pruning and barking members 12 and 14, respectively, to a position in which the barking edge 13 is trailing and scraping along the envelope surface of the log while the pruning member 12 is hacking and cutting branches and twigs by its edge 16. The dotted circle in FIG. 4 represents the position of a log being pruned and barked. Observe how the edge 16 is at a small distance from the envelope surface of the log. Hereby the edge 16 is prevented from interference with the bark and only allowed to cut branches.

The tool 15 has a known rounded form.

The tool may also have a straight form, especially if the raising edge 11 is cancelled.

The pruning member 12 may be made of a piece of sheet metal which through forging, grinding, punching or other methods has received the shown form, and which is welded, soldered or otherwise fastened to the tool 15. FIG. 5 shows how the pruning edge is leading before the barking edge 13 so that pruning is effected first and thereafter the barking. This order produces an extremely even and efficient barking.

Figure 9:
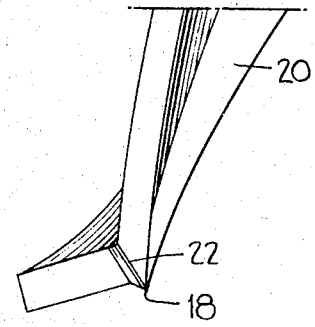
FIG. 9 is a view seen in the direction of the arrow IX in FIG. 8.
Figure 7:
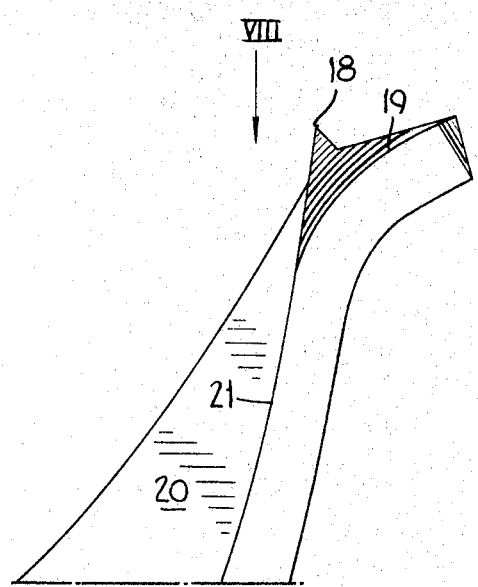
FIG. 7 is a plan view of a third embodiment of the tool.
Figure 10:
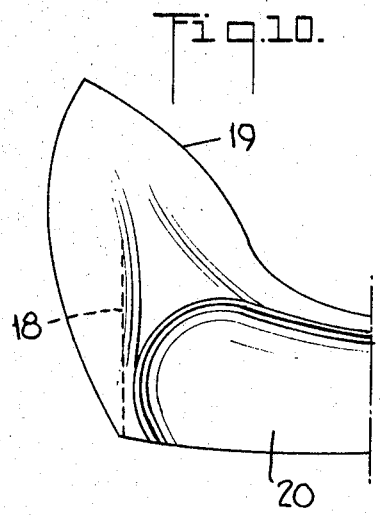
FIG. 10 is a view seen from above in FIG. 9.

In the embodiment shown in FIGS. 7–10 the tool may be made integral with the barking and pruning members which are represented by the edges 18 and 19, respectively. The tool is as a whole designated by 20.

The pruning edge 19 may form a smooth continuation to a raising edge 21, the pruning edge deviating from the raising edge in a direction outwardly from the log and the barking edge 18. In this embodiment the pruning and barking edges 19 and 18, respectively, are not parallel to each other. The principle is, however, the same, since the pruning edge 19 is running before the barking edge 18 and adapted to be situated at a small distance from the bark of the log. The barking edge 18 will glide easily over the remaining short branch stumps without losing its grip against the log.

Also in the embodiment in FIGS. 7–10 the portions carrying the pruning and barking edges may consist of individual parts which are fastened to the tool body 20 by welding as at 22 or in any other suitable way. It is also possible to cancel the raising edge, a rounded portion joining the pruning edge 19 more or less smoothly. If the embodiment in FIGS. 7–10 is made of one piece the pruning and barking portions may be formed by forging and grinding. If the raising edge 21 is cancelled the portion carrying the edge 19 may be provided with suitable raising means, e.g., cams or the like resembling the cams in FIGS. 4–6.

In the embodiment according to FIGS. 1–3 the hollow rotor and the tools 1 may rotate clockwise, in the embodiments in FIGS. 4–10 anticlockwise, seen in the feed direction of the logs.

It may be observed that the invention is not to be considered as restricted only to the embodiments shown and described since other embodiments are possible.

Thus, embodiments are possible which have more than one barking member and/or pruning member. A number of pruning members may be arranged to remove the branches and twigs stepwise one after another.

The edge of the pruning member may have teeth in order to perform a sawing action upon the branches and twigs. The edge should then be oblique, forming a comparatively small angle with its direction of movement in respect of the log or the twigs.

It is possible to use edges formed by inserted bits placed permanently or removably in recess in the tools. Bits of sintered carbides or other hard materials may be used.

The abovementioned circulating movement of the tools about the logs is the relative movement between the logs and the tools. The invention may be used in quite different machines than in machines having hollow rotors for mounting the tools, since the tools may instead be resiliently or swingably mounted on stationary devices or holders, the logs rotating in a required direction by means of arbitrary rotating devices. Even then the tool can be said to perform a relative circulation around the log.

Generally speaking, the tools and edges according to the invention may be applied in arbitrary or known driving devices.

We claim:

1. A debarking and pruning tool comprising:
   an arm,
   a debarking edge at a first end of said arm, and
   a pruning edge near said first end of said arm, the line of said pruning edge being skew to the line of said debarking edge.

2. The debarking and pruning tool of claim 1 wherein said pruning edge is disposed relative to said debarking edge so that the angle between said edges is greater than 25°.

3. The tool of claim 2 wherein said angle is substantially 45°.

4. A debarking and pruning tool comprising:
   an arm,
   a debarking edge at a first end of said arm, and
   a pruning edge set back from said first end of said arm, the line of said pruning edge being skew to the line of said debarking edge.

5. A debarking and pruning tool comprising:
   an arm,
   a debarking edge at a first end of said arm, and
   an arcuate pruning edge set back from said debarking edge, the plane of said pruning edge intersecting with the line of said debarking edge, the angle between said line and said plane being greater than 25°.

6. In a debarking machine of the hollow-head type in which a log is fed through a rotatable hollow-head so as to be debarked, a debarking and pruning tool comprising:
   an arm having a first end and a second end, said arm being pivotally mounted at said second end to said head,
   means for resiliently pressing said first end of said arm against whatever log may be fed through said head,
   a debarking edge at said first end of said arm, and
   a pruning edge near said first end of said arm, the line of said pruning edge being skew to the line of said debarking edge.

7. The debarking and pruning tool of claim 6 in which said pruning edge is set back from said debarking edge so that the radius at which said pruning edge rotates is greater than the radius at which said debarking edge rotates.

8. The debarking and pruning tool of claim 6 in which said pruning edge forms a continuation to a known rising edge adapted to lift the tool up to the envelope surface of whatever log is fed through said head.

9. The debarking and pruning tool of claim 6 in which said pruning edge is formed by surfaces adapted to engage the end of the log and thereby lift the pruning edge and the tool up onto the envelope surface of the log.

10. In a debarking machine of the hollow-head type in which a log is fed through a rotatable hollow-head so as to be debarked, a debarking and pruning tool comprising:
    an arm having a first end and a second end, said arm being pivotally mounted at said second end to said head,
    means for resiliently pressing said first end of said arm against whatever log may be fed through said head,
    a debarking edge at said first end of said arm, said debarking edge being disposed so that there is a plane containing said debarking edge which is substantially parallel to the axis of rotation of said head, and
    a pruning edge near said first end of said arm, the line of said pruning edge being skew to the line of said debarking edge, said pruning edge being disposed so that there is a plane containing said pruning edge which is substantially parallel to the axis of rotation of said head.

11. The debarking and pruning tool of claim 10 in which said pruning edge is set back from said debarking edge so that the radius at which said pruning edge rotates is greater than the radius at which said debarking edge rotates.

12. The debarking and pruning tool of claim 11 in which said pruning edge is formed by surfaces adapted to engage the end of the log and thereby lift the pruning edge and the tool up onto the envelope surface of the log.

13. The debarking and pruning tool of claim 11 in which the pruning edge forms a continuation adapted to lift the tool up to the envelope surface of whatever log is being operated on by said tool.

References Cited by the Examiner

UNITED STATES PATENTS

| | | |
|---|---|---|
| 2,477,922 | 8/1949 | Emery et al. |
| 2,583,971 | 1/1952 | Shuff. |
| 2,787,304 | 4/1957 | Brundell et al. |
| 2,802,495 | 8/1957 | Nicholson. |

FOREIGN PATENTS

| | | |
|---|---|---|
| 605,649 | 9/1960 | Canada. |
| 27,226 | 2/1955 | Finland. |
| 90,087 | 9/1957 | Norway. |

WILLIAM W. DYER, JR., *Primary Examiner.*

EARL EMSHWILLER, *Examiner.*

W. D. BRAY, *Assistant Examiner.*